United States Patent
Shatford

(10) Patent No.: US 10,623,851 B2
(45) Date of Patent: Apr. 14, 2020

(54) ENCLOSURE FOR AN AUDIO SPEAKER

(71) Applicant: Transverse Technology Limited, Beckenham, Christchurch (NZ)

(72) Inventor: Michael Craig Shatford, Christchurch (NZ)

(73) Assignee: TRANSVERSE TECHNOLOGY LIMITED, Christchurch (NZ)

( * ) Notice: Subject to any disclaimer, the term of this patent is extended or adjusted under 35 U.S.C. 154(b) by 0 days.

(21) Appl. No.: 15/769,161

(22) PCT Filed: May 20, 2016

(86) PCT No.: PCT/NZ2016/050082
§ 371 (c)(1),
(2) Date: Apr. 18, 2018

(87) PCT Pub. No.: WO2017/074200
PCT Pub. Date: May 4, 2017

(65) Prior Publication Data
US 2018/0302710 A1 Oct. 18, 2018

(30) Foreign Application Priority Data

Oct. 30, 2015 (NZ) ........................................ 713814
May 20, 2016 (NZ) ........................................ 720385

(51) Int. Cl.
*H04R 1/28* (2006.01)
*H04R 1/02* (2006.01)
(Continued)

(52) U.S. Cl.
CPC .......... *H04R 1/2888* (2013.01); *B29C 69/02* (2013.01); *B33Y 80/00* (2014.12); *H04R 1/025* (2013.01);
(Continued)

(58) Field of Classification Search
CPC ...... H04R 1/2888; H04R 1/025; H04R 1/288; H04R 2201/029; B33Y 80/00;
(Continued)

(56) References Cited

U.S. PATENT DOCUMENTS 4,964,482 A 10/1990 Meyer
8,869,931 B1 * 10/2014 Gahimer .............. H04R 1/2815
181/152

(Continued)

FOREIGN PATENT DOCUMENTS

EP         1220568 A3    8/2003

OTHER PUBLICATIONS

International Search Report in application No. PCT/NZ2016/050082, dated Aug. 22, 2016.
(Continued)

*Primary Examiner* — Andrew L Sniezek
(74) *Attorney, Agent, or Firm* — Knobbe, Martens Olson & Bear LLP

(57) ABSTRACT

A method of forming an enclosure for an audio speaker including forming a rigid inner shell for the enclosure, the inner shell being in a single piece and configured to accept the speaker; and forming an outer shell for the enclosure, the outer shell having an inner surface bounded by the rigid inner shell, the outer shell being in a single piece monocoque construction which includes all the load bearing structures of the enclosure.

28 Claims, 3 Drawing Sheets

(51) Int. Cl.
| | |
|---|---|
| *B33Y 80/00* | (2015.01) |
| *B29C 69/02* | (2006.01) |
| *B33Y 10/00* | (2015.01) |
| *B29K 55/02* | (2006.01) |
| *B29K 67/00* | (2006.01) |
| *B29K 105/16* | (2006.01) |
| *B29L 31/34* | (2006.01) |

(52) U.S. Cl.
CPC .... *B29K 2055/02* (2013.01); *B29K 2067/046* (2013.01); *B29K 2105/16* (2013.01); *B29L 2031/3418* (2013.01); *B33Y 10/00* (2014.12); *H04R 1/288* (2013.01); *H04R 2201/029* (2013.01)

(58) Field of Classification Search
CPC ..... B33Y 10/00; B29C 69/02; B29K 2055/02; B29K 2067/046; B29K 2105/16; B29L 2031/3418
See application file for complete search history.

(56) References Cited

U.S. PATENT DOCUMENTS

2012/0318607 A1    12/2012  Reviel
2018/0206027 A1*   7/2018   Dekel .................... H04R 1/021

OTHER PUBLICATIONS

International Preliminary Report on Patentability in application No. PCT/NZ2016/050082, dated Dec. 7, 2016.

* cited by examiner

ENCLOSURE FOR AN AUDIO SPEAKER

This application is the U.S. National Phase under 35 U.S.C. § 371 of International Application PCT/NZ2016/050082, filed May 20, 2016, designating the U.S., and published in English as WO 2017/074200 on May 4, 2017, which claims priority to New Zealand Patent Application No. 713814, filed Oct. 30, 2015; and New Zealand Patent Application No. 720385, filed May 20, 2016, the entire contents of which are incorporated herein by reference.

TECHNICAL FIELD

The invention relates to an enclosure for a speaker for reproducing recorded sound. In particular it relates to improvements to high fidelity speaker enclosures.

BACKGROUND ART

Ever since recordings of sound began there has been a concerted effort to perfect not only the recording but also the reproduction of the recorded sound. There are numerous ways in which the recorded sound can be changed prior to the sound reaching a listener. It is not our intention here to enumerate all the ways in which distortion of the recorded sound can occur. Suffice to say that over the years advances in technology, especially digital recording and digital processing of sound, has helped reduce or eliminate distortions in the recorded sound prior to the data signal being sent to the speakers. Our concern here is directed to the design of speaker enclosures as one of the last remaining significant sources of distortion in sound reproduction.

Traditionally speaker enclosures were constructed as a hollow wooden (often MDF) box, with a cut-out in the front of the box into which the speaker driver (referred to the speaker henceforth) was mounted. The box typically had a rectangular cuboid shape with sharp edges both inside the hollow cavity of the enclosure and on the outer surface of the enclosure.

It was quickly realised that sharp edges within and around the speaker enclosure could produce distortion to the sound being broadcast due to diffraction of the sound wave around the edge. It was also apparent that the parallel sides of these enclosures could lead to standing waves being created inside the enclosure. These standing waves take energy to create, and therefore a reduction of energy in the transmitted sound at the frequency of the standing wave.

Furthermore, a major concern was sound reflected from the inner surfaces of the speaker enclosure: it is well known that the reflected sound wave, which is created by sound transmitted from the back of the speaker, is out of phase with the sound broadcast out the front of the speaker. This can lead to both constructive and destructive interference of the transmitted sound, both creating distortion of the transmitted sound at various locations in front of the speaker. While interference can in principle occur over at any frequency, it is particularly noticeable at low (bass) frequencies.

Finally; mechanical vibration induced by the motion and inertia of the speaker cone is transmitted and amplified where the reproduced frequencies stimulate, align or interact with the resonant frequencies of the enclosure structure or cavity. The resulting amplified frequencies can be of a magnitude such that they interfere with the sound being projected by the speaker, thus introducing distortion into the reproduced sound.

It is well known in the art that an ideal mounting, especially for a low-frequency speaker, would consist of a large, rigid panel—ideally infinite in size with an infinite space behind the panel to remove reflection of out of phase sound emitted from the rear of the speaker. Clearly such a mounting is not practical, especially in a domestic setting. In a domestic setting there is generally a requirement that the speaker has some aesthetic appeal as well as being limited in size so as not to dominate a room. Furthermore, it is known that the enclosure needs to be rigid without being overly heavy, and be constructed in such a manner as to reduce or eliminate distortion of the frequencies emitted from the speakers by unwanted sound generated within or around the speaker enclosure.

It is an object of the present invention to address the foregoing problems or at least to provide the public with a useful choice.

All references, including any patents or patent applications cited in this specification are hereby incorporated by reference. No admission is made that any reference constitutes prior art. The discussion of the references states what their authors assert, and the applicants reserve the right to challenge the accuracy and pertinency of the cited documents. It will be clearly understood that, although a number of prior art publications are referred to herein, this reference does not constitute an admission that any of these documents form part of the common general knowledge in the art, in New Zealand or in any other country.

Throughout this specification, the word "comprise", or variations thereof such as "comprises" or "comprising", will be understood to imply the inclusion of a stated element, integer or step, or group of elements integers or steps, but not the exclusion of any other element, integer or step, or group of elements, integers or steps.

Further aspects and advantages of the present invention will become apparent from the ensuing description which is given by way of example only.

DISCLOSURE OF THE INVENTION

According to one aspect of the present invention there is provided method of forming an enclosure for an audio speaker including the steps of:
  forming a rigid inner shell for the enclosure, the inner shell being in a single piece and configured to accept the speaker; and
  forming an outer shell for the enclosure, the outer shell having an inner surface bounded by the rigid inner shell,
wherein the outer shell is a single piece monocoque construction which includes all the load bearing structures of the enclosure.

Reference to a monocoque construction throughout this specification should be understood to refer to a construction technique for an object in which the outer skin or shell of the object is formed as a single, integral structure which is configured such that the outer skin or shell absorbs all of the loads and related stresses that are applied to the object. This is in contrast to other non-monocoque forms of construction where the outer shell is supported on or by a framework of load bearing members. In the present invention the enclosure is formed as an external (or outer) shell which is bounded on the inside by a surface of a relatively thin inner shell which is shaped so as to create load bearing members within the external shell as it is formed.

A significant advantage of a monocoque construction for the outer shell is that it may provide superior structural rigidity to the speaker enclosure. Structural rigidity is believed to be important in reducing or eliminating any vibrational movement of the external shell as can occur in traditional speaker enclosures, especially when the speakers are performing at high volume. Apart from anything else, the energy required to create vibrations in the external shell is supplied by the speakers, thus not only potentially introducing distortion to the sound (at the frequency of the vibration) but also reducing the output of the speakers, especially at frequencies which are transmitted at low volume.

In a preferred embodiment the outer shell is formed as a single, integral housing for the speaker enclosure, the outer shell being shaped to provide all of the load bearing members of the enclosure.

In a preferred embodiment an exterior surface of the outer shell includes smoothly curved edges only.

Forming the outer shell as a single, integral, member may provide an enclosure without any joins, corners or sharp edges, all of which can create distortion of the audio frequencies produced by the speakers.

In a preferred embodiment the step of forming the outer shell includes the steps of:
  suspending the rigid inner shell inside an outer shell mould; and
  filling a cavity between the suspended inner shell and the outer shell mould with material.

The use of injection moulding in forming speaker enclosures is not new. However, using injection moulding to form a monocoque shell for a speaker enclosure is considered to be novel and inventive. An advantage of the method of the present invention is that the rigid inner shell may be contoured to create all the load bearing structures (beams, ribs, braces, columns, struts and any tensile/compressive members) integrally within the outer shell when the cavity is filled with material.

A further advantage of the use of an inner shell which forms part of the enclosure is that there is no need to remove any inner mould tooling as would be required to produce inner contours in a conventional moulding process.

As discussed further below, the shapes of the load bearing members, e.g. a rib, and in particular the contours of the inner shell that form them, may be carefully chosen so as to reduce or eliminate distortion of any sound within the enclosure (i.e. in the interior cavity bounded by the inner shell) due to turbulence and acoustic reflections.

Eliminating turbulence and acoustic reflections from a speaker enclosure made using traditional methods can be very labour intensive and time consuming, and can require specialized machining techniques, all of which can add to the cost of the speaker enclosure.

In contrast with the method of the present invention there is an initial cost in forming the inner shell and outer shell mould; however, once formed the mould may be used to form numerous speaker enclosures, which may reduce the cost per enclosure significantly.

In a preferred embodiment the step of forming an outer shell for the speaker enclosure includes forming a rib in the outer shell.

In a preferred embodiment the step of forming a rib includes forming a rib that extends into an interior cavity of the speaker enclosure, the interior cavity being bounded by an interior surface of the inner shell.

In a preferred embodiment the step of forming a rib includes forming at least a portion of the rib having a smoothly curved cross section.

In a preferred embodiment the step of forming a rib includes forming the rib such that an entire length of the rib includes a smoothly curved cross section.

In this embodiment the rib is formed in the outer shell such that a portion of the surface of the rib resembles front edge of an airfoil. That is, essentially the interior surface of the inner shell that forms the rib, is designed aerodynamically to simulate a front edge of a wing. In this manner any sound waves (i.e. air flow) around the rib may flow smoothly over the rib and onto the interior surface of the inner shell near the rib. This design may reduce or eliminate distortions to the sound wave that can otherwise occur if the contour of the rib is not smoothly varying.

In a preferred embodiment the step of forming the rib includes forming a rib that extends along a side of the interior cavity, the rib being orientated in a plane substantially parallel to a longitudinal axis of the speaker.

In a preferred embodiment the step of forming the rib includes forming a rib that extends around the interior surface of the inner shell.

In a preferred embodiment the step of forming the outer shell includes forming at least two or more ribs.

In a preferred embodiment the step of forming the outer shell includes forming ribs each of which includes a smoothly curved cross section that extends along a side of and into the interior cavity of the speaker cabinet.

In a preferred embodiment a spacing between each adjacent pair of ribs has a different value for each pair of ribs.

This arrangement is to limit or prevent summation of similar frequency panel resonances within the interior cavity that may arise if the spacing between adjacent pairs of ribs were to be the same.

The ribs are designed to provide rigidity to the outer shell of the speaker enclosure.

The inner shell must be sufficiently rigid so as not to distort when the cavity between the inner shell and the outer shell mould is filled with material.

In some embodiments the step of forming the inner shell includes using an inner shell mould.

In a preferred embodiment the inner shell, or a portion thereof, is formed as a single piece.

A single piece construction may have the advantage of reducing any possible movement or sharp edges (which can distort sound waves passing over the edge) which may occur if two or more pieces are joined together to form the single inner shell. A single piece inner shell may be formed, for example, using additive manufacturing technology.

The term "additive manufacturing" is to be interpreted as describing technologies that build 3D objects by adding layer upon layer of material sequentially to form the 3D object. Additive manufacturing technologies include 3D printing and rapid prototyping, among others.

A significant advantage of using additive manufacturing processes to form the inner shell is that such technologies are capable of creating very complex shapes, shapes that would be considerably more difficult to produce by more traditional methods. Furthermore, additive manufacturing techniques, such as 3D printing, may provide a superior finish to the interior surface of the inner shell, which may be critical in reducing distortions of the sound within the speaker enclosure.

Despite the above, in some embodiments the inner shell may be formed by joining two or more components together to form a single piece. In such embodiments care needs to be taken that the joins between the components are smooth on the interior surface of the inner shell.

In a preferred embodiment the step of forming the inner shell includes forming at least a portion of the inner shell using additive manufacturing.

In a preferred embodiment the step of forming the inner shell includes forming the inner shell as a single piece using additive manufacturing.

In a preferred embodiment the step of forming the inner shell includes forming a thickness of the inner shell in the range from 1 mm to 5 mm.

In a preferred embodiment the step of forming the inner shell includes forming a thickness of the inner shell in the range from 1 mm to 3 mm.

A thin wall thickness of the inner shell is desirable so as to minimize the amount (and cost) of material used in the additive manufacturing process, as well as to limit the time taken to form the inner shell. At the same time the thickness of the inner shell and the material used to make it, must be such that there is sufficient rigidity in the inner shell for it not to distort during formation of the outer shell. The thickness of the inner shell also needs to be kept low (in relation to the thickness of the outer shell) so as to provide as much volume to the interior cavity of the speaker enclosure as possible for the size of the enclosure. The volume of the interior cavity is important for reproduction of bass frequencies in particular—the bigger the available interior volume (with respect to the dimensions of the speaker enclosure) the better (or more accurate) the reproduction of bass frequencies.

In a preferred embodiment the step of forming the inner shell includes forming contours in the inner shell which create load bearing structures in the outer shell of the enclosure when formed.

In a preferred embodiment the step of forming the inner shell includes forming a randomly rippled surface in at least a portion of an interior surface of the inner shell.

In a preferred embodiment the step of forming the inner shell includes forming the interior surface of the inner shell which contains smoothly curved contours only.

A consequence of forming the interior surface from smoothly curved contours only is that there are no flat surfaces nor any sharp edges in the interior cavity of the speaker enclosure. Any sounds reflected off the curved surfaces may be scattered in many directions, thus reducing any tendency to produce standing waves in the interior cavity of the speaker enclosure. Furthermore the lack of any sharp edges may reduce the distortion introduced by diffraction of the sound wave over the sharp edge.

In a preferred embodiment the step of forming the inner shell includes forming opposing sides of the inner shell which are not parallel to one another.

Again, curved, non-parallel opposing sides (or surfaces) of the inner shell may reduce the occurrence of standing waves or resonances created by sound waves reinforcing (or cancelling) as can occur when sound waves are reflected by flat parallel sides.

A consequence of the inner shell being formed by smoothly curved contours only and with opposing sides which are non-parallel, is that a thickness of the outer shell is continuously varying around the speaker enclosure.

In a preferred embodiment the step of forming the inner shell includes configuring the inner shell to accept a plurality of speakers.

As is well known, multiple speakers are commonly included within a single speaker enclosure, each speaker being configured for a specific frequency range. The frequency is switched electronically between the speakers at predetermined crossover frequencies.

In a preferred embodiment the method of forming the speaker enclosure includes forming the inner shell and the outer shell mould to form an electronics cavity the speaker enclosure.

Preferably the electronics cavity is formed outside of the interior cavity of the speaker enclosure.

Preferably the electronics cavity is located on the side of the speaker cavity opposite to the side housing the speaker; or on the bottom of the enclosure.

In a preferred embodiment the step of forming the outer shell includes filling the cavity between the inner shell and the outer shell mould with an epoxy or polyurethane binding/base material infused with one or more of the following:

Rubber spheres/chips preferably 0.5 mm-3 mm diameter/nominal size;

Glass microspheres of 0.1-0.5 mm diameter, of specific gravity less than 0.5;

Wood fibre;

Glass and Granite rumbled or sharp pieces 2-3 mm nominal size; and/or

Various powders to thicken or change the liquidity of the mixture. It will be appreciated that such powdering as are well known in the art.

It will also be appreciated that the above list is not intended to be limiting and other materials may be infused in the epoxy or polyurethane binding/base material.

In a preferred embodiment the step of forming the inner shell includes forming a port through the exterior shell of the speaker enclosure. The port forms part of the load bearing structure.

It is common to form a port (essentially an aperture connecting the interior cavity of the speaker enclosure to the outside) that may (if suitably shaped and dimensioned) enhance base frequency response at the natural resonance frequency of the base driver, or alternatively may reduce distortion at bass frequencies. The port may be positioned anywhere in the speaker enclosure, the location depending on the specific design of the enclosure.

In a preferred embodiment the method of forming the inner shell includes forming the inner shell and outer shell mould to include within the outer shell electrical reticulation and connections between the speaker and electronics.

An advantage of this method is that the electrical connection (copper bus bar for example) can be inserted during manufacture of the enclosure where access would otherwise be difficult or impossible. The electrical connections can also be kept out of the interior cavity of the enclosure where they could otherwise vibrate against the inner wall of the enclosure or the speaker thus causing audible distortion. Furthermore, embedding the electrical connection in an appropriate location may result in minimizing the length of wire required to connect to the speaker driver, which may in turn reduce any distortion that may be caused by the wire being inside the interior cavity of the enclosure.

In a preferred embodiment the method includes the step of applying an open celled, medium density, foam structure to the interior surface of the inner shell.

An advantage of attaching an open celled foam structure to the interior surface of the inner shell (i.e. to the surface of the interior cavity of the speaker enclosure) is that it may assist with absorption of sound waves inside the interior cavity which would otherwise reflect off the interior surface of the inner shell.

In a preferred embodiment the method includes the step of applying the foam structure to the interior surface of the inner shell prior to the inner shell being suspended into the outer shell mould.

In a preferred embodiment the method includes the application of an open celled foam in a liquid form (which cures after application, forming the open celled foam layer) prior to or after the inner shell has been used to form the interior cavity.

In alternative embodiments of the method the foam structure may be applied to the interior surface of the inner shell after the speaker enclosure has been formed.

In alternative embodiments of the method a sheet of open celled, medium density, foam material is attached to the interior surface of the inner shell.

In these embodiments the sheet of foam may be bonded to the interior surface by any of the means well known in the art.

In a preferred embodiment of the method the step of applying foam to the interior surface of the inner shell includes forming a layer having a thickness equal to a quarter of the wavelength of a predetermined frequency to be controlled.

Using a thickness of a quarter wavelength of the desired frequency is that this may reduce or eliminate reflection of waves at the desired frequency from the interior surface of the inner shell.

In a preferred embodiment the method includes the step of filling the interior cavity of the speaker enclosure with sound absorbing material.

Sound absorbing material, such as polyester fibre, wool, glass fibre and/or combinations of these materials, among others, may be used to absorb and dampen any sound waves within the interior cavity of the speaker enclosure.

According to another aspect of the present invention there is provided an enclosure for an audio speaker formed by the above method.

According to another aspect of the present invention there is provided an enclosure for a speaker including an inner shell configured to accept the speaker and an outer shell having an inner surface bounded by the inner shell, wherein the outer shell is a monocoque construction.

In a preferred embodiment an outer shell of the speaker enclosure includes a rib formed in the outer shell.

In a preferred embodiment the rib extends into an interior cavity of the speaker enclosure, the interior cavity being bounded by an interior surface of the inner shell.

In a preferred embodiment at least a portion of the rib includes a smoothly curved cross section.

In a preferred embodiment an entire length of the rib includes a smoothly curved cross section.

In a preferred embodiment the rib extends along a side of the interior cavity, the rib being orientated in a plane substantially parallel to a longitudinal axis of the speaker driver.

In a preferred embodiment the rib extends around the interior surface of the inner shell.

In a preferred embodiment the outer shell includes a plurality of ribs.

In a preferred embodiment the outer shell includes a plurality of ribs each of which includes a smoothly curved cross section that extends along a side of and into the interior cavity of the speaker cabinet.

In a preferred embodiment the speaker enclosure includes a rigid inner shell formed as a single piece.

In a preferred embodiment the inner shell includes a randomly rippled surface in at least a portions of an interior surface of the inner shell.

Ideally the whole of the interior surface of the inner shell is randomly rippled.

In a preferred embodiment the interior surface of the inner shell contains smoothly curved contours only.

In a preferred embodiment opposing sides of the inner shell are not parallel to one another.

In a preferred embodiment a thickness of the outer shell is continuously varying around the speaker enclosure.

In a preferred embodiment the speaker enclosure includes an electrical connection between the outside of the speaker enclosure and the interior cavity of the speaker enclosure, wherein the electrical connection is embedded in the outer shell.

BRIEF DESCRIPTION OF DRAWINGS

Further aspects of the present invention will become apparent from the following description which is given by way of example only and with reference to the accompanying drawings in which.

BEST MODES FOR CARRYING OUT THE INVENTION

Figure 9:
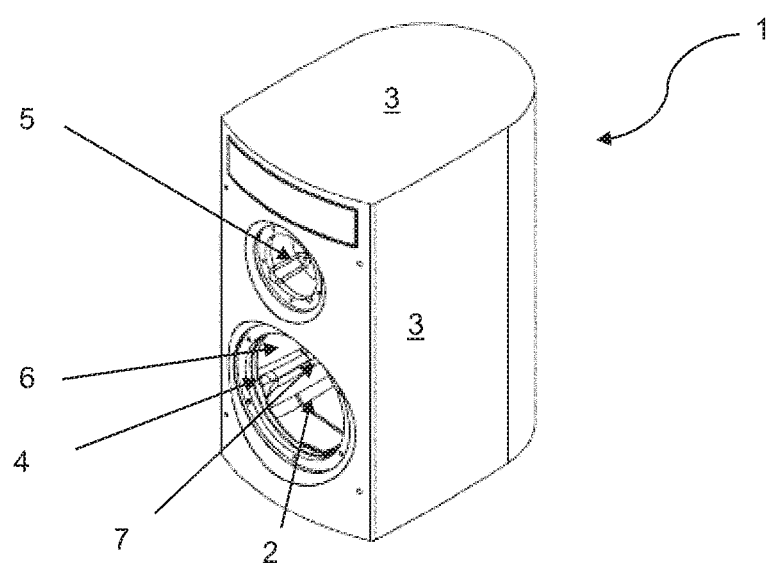
FIG. 9 shows a speaker enclosure according to the preferred embodiment of the present invention.

A speaker enclosure according to a preferred embodiment of the present invention is generally indicated by arrow 1 in FIG. 9. The type of speaker enclosure discussed below and as illustrated in the accompanying drawings is of the type that may be suitable for use as a book shelf speaker, for example. It will be apparent to those skilled in the art that many different forms of speaker enclosure may be formed using the method of the present invention, from the relatively small speaker enclosure shown in the attached drawings, to large, free-standing, multi-speaker enclosures having considerably more structural elements in the outer shell than shown for the embodiment shown in the figures. Hence discussion here of this particular embodiment should not be seen as limiting.

Figure 5:
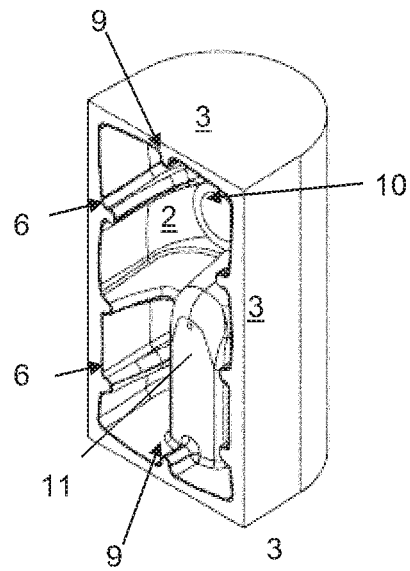
FIG. 5 shows a rear cut away section of a speaker enclosure according to the preferred embodiment of the present invention.
Figure 6:
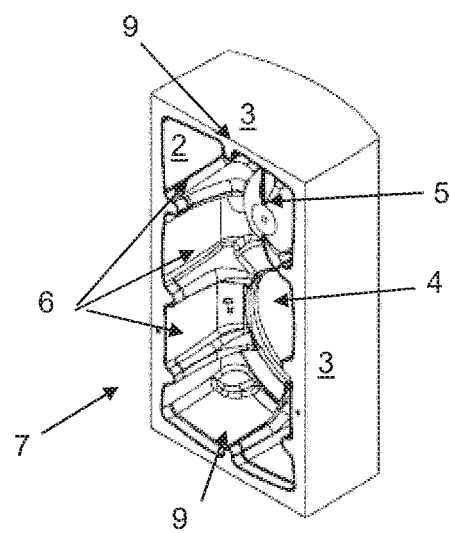
FIG. 6 shows a front cut away section of the speaker enclosure shown in FIG. 5.

The speaker enclosure 1 is formed from an inner shell 2 and an outer shell 3—see FIG. 5, 6 or 9. This embodiment of the speaker enclosure includes two apertures 4, 5 for mounting speakers—see FIG. 9. Obviously in other embodiments any number of speaker mounting apertures may be included as required by the design.

The inner shell 2 forms ribs 6 which extend into the interior cavity 7 of the speaker enclosure as shown in FIG. 6. The exterior surface of the outer shell (i.e. the exterior surface of the speaker enclosure) includes smoothly curved edges only.

Figure 1:
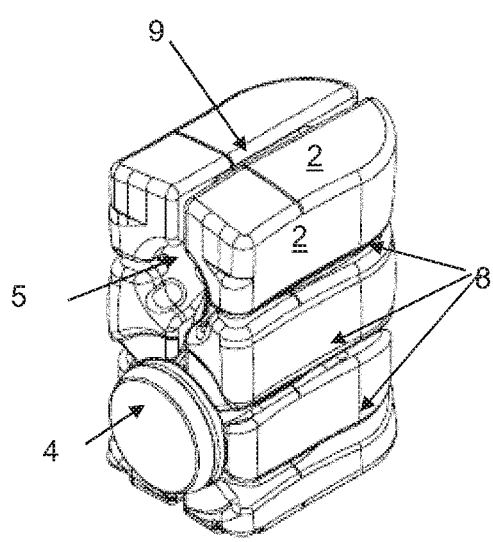
FIG. 1 shows the inner shell of a speaker enclosure according to a preferred embodiment of the present invention.
Figure 2:
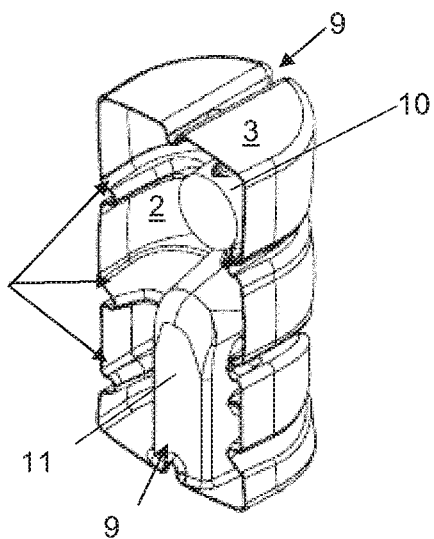
FIG. 2 shows a cut away rear section of the inner shell shown in FIG. 1.

The inner shell, which is shown in more detail in FIG. 1 and FIG. 2 (cutaway view of the rear of the inner shell), is formed as a single piece using additive manufacturing techniques.

Additive manufacturing technologies build 3D objects by adding layer upon layer of material, which may be plastic, metal, concrete or indeed any suitable material that can be formed layer by layer. Typically additive manufacturing uses a computer loaded with 3D modelling software (CAD), and a machine for adding the layers and layered material. Once the CAD drawing is produced the additive manufacturing equipment reads the data from the CAD file and lays down successive layers of liquid, powder, sheet material or other material in a layer by layer fabrication of the desired 3D object. The term additive manufacturing encompasses several modern construction technologies, including 3D printing, rapid prototyping (RP), direct digital manufacturing (DDM), layered manufacturing and additive fabrication. A key advantage of additive manufacturing techniques is that they may be used to create complex shapes, as in this invention, which would be very expensive and time consuming (if possible at all) using traditional manufacturing techniques.

In this embodiment the inner shell 2 is formed by 3D printing techniques by forming consecutive layers of Acrylonitrile Butadiene Styrene (ABS) plastic. Alternatively, Polylactic Acid (PLA) plastic may be used as the material for 3D printing of the inner shell. An advantage of using either of these materials is that complex shapes may be formed with the 3D printing process as it is at the moment. However, an inner shell formed by either ABS or PLA plastic will have a surface facing into the interior cavity of the speaker enclosure which does not absorb sound, but rather one which reflects sound back into the cavity: obviously this is not ideal. An ideal material for forming the inner shell would be one that can be 3D printed and which produces a sound absorbing surface. The applicant knows of no such material available at present, but hopefully one will be found as the technology evolves.

The shape of the inner shell is determined by the designer as a CAD file. The inner shell performs two important functions: its external surface provides a rigid mould that forms the inner surface of the external shell during the step of injection moulding (discussed more below); and the interior surface of the inner shell forms the surface of the interior cavity of the speaker enclosure. The first of these functions is used when forming the load bearing structures of the outer shell, such as the rib 6, while the second is designed to provide the necessary surfaces and surface preparations to reduce and/or eliminate distortion of the sound produced by the speakers.

Once the CAD file has been created the data from the file is inputted into the 3D printing system; the resulting shape for this embodiment is shown in FIG. 1 and a cutaway view of the rear of the inner shell in illustrated in FIG. 2. The applicant has found that a thickness of the inner shell in the range from 1 mm to 3 mm is sufficient to achieve a workable balance between the requirements for rigidity of the inner shell (during formation of the outer shell) and conservation of materials used to form it.

The inner shell 2 in this embodiment includes rib-forming shapes 8—which produce the three ribs 6—that extend around the interior cavity of the speaker enclosure. The portion of the rib-forming shapes 8 on the sides of the inner shell are in a plane substantially parallel to a vertical plane through the mid-section of either of the speaker drivers from the front to the rear of the speaker. As the speaker drivers are typically mounted to the enclosure such that the front of the speaker is vertical (i.e. with the base of the speaker enclosure supported on a horizontal surface), the plane of the rib-forming shapes 8 is horizontal as well.

In some embodiments it may not be possible, due to structural obstructions, for the ribs to be aligned with a longitudinal axis of the speaker drivers. In such embodiments the ribs around the walls of the enclosure may be inclined with respect to the longitudinal axis of the speaker driver, though the angle of inclination is generally kept to a minimum, and seldom more than 25°.

A further rib-forming shape 9 extends across the top of the inner shell from the front to the rear, down the back and from the rear to the front of the base of the inner shell. The rib-forming shapes 8, 9 extend into the interior of the inner shell 2. Their shape is designed to provide a smoothly curved surface over which sound waves can flow aerodynamically with little or no distortion.

The cut out view of the rear of the inner shell 2, generally indicated by arrow 2' in FIG. 2, includes shaping the surface of the inner shell to create a port 10, in the form of a shaped aperture through the rear of the speaker enclosure, and a housing 11 for the electronics required for the speakers. The housing 11 forms a cavity at the back of the speaker enclosure into which the electronics are placed. Not only does this remove the electronics from the interior cavity of the speaker enclosure (where they can create distortion of the sound waves) but also enables the electronics to be accessed relatively easily.

Prior to the injection moulding step the interior surface of the inner shell is covered with a thickness of medium density open cell foam. This is conveniently applied as a liquid spray which, when combined with a foaming agent, creates the foam structure. The amount of foam applied is chosen to create a layer of foam having a thickness approximately equal to a quarter of the wavelength of a predetermined frequency to be damped.

Figure 3:
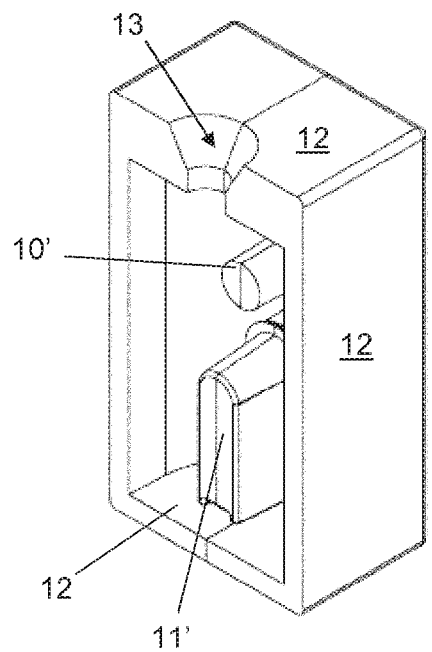
FIG. 3 shows a cut away section of a mould according to a preferred embodiment of the present invention.

A cut out view of the rear of an outer shell mould 12 is shown in FIG. 3. The outer shell mould 12 is shaped to provide the exterior surface 3 of the speaker enclosure and the surfaces, which together with the inner shell, create the internal structure of the outer shell. As shown in FIG. 3, the form 10' creates the aperture to form the port 10, and the blanked off part 11' creates the inner surface of the housing 11 for the electronics. The outer shell mould 12 includes an aperture 13 through the mould: this aperture is used to inject the material used to form the outer shell during the injection moulding process. Ventilation of cavity 14 may be required at strategic positions to allow displaced air to escape as cavity 14 is filled.

Figure 4:
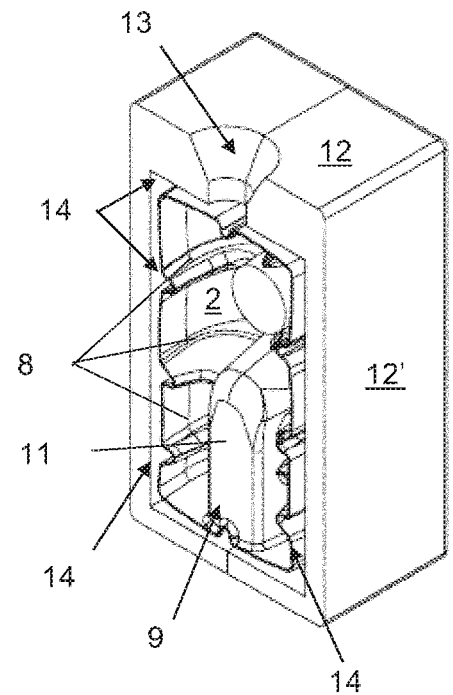
FIG. 4 shows a cut away rear section of an inner shell shown in FIG. 2 suspended in the mould of FIG. 3.

To form the outer shell of the speaker enclosure the inner shell 2 is suspended inside the outer shell mould 12, so that a cavity 14 is formed between the inner shell and the internal surface of the outer shell mould, as shown in the cut away view of the rear of the speaker enclosure in FIG. 4. The width of the cavity 14 varies depending on which part of the cavity is being considered. However, the applicant has found that a width of at least 14 mm is required to provide the required rigidity to the outer shell and to ensure the moulding process is successful (i.e. all the various complex surfaces of the cavity 14 are properly filled with material and that a homogenous casting can result).

At this point electrical connections, in the form of electrical conductors 15 are suspended in the cavity between the interior of the housing for the electronics and into the interior cavity of the speaker enclosure in the vicinity of the speaker housings. In this way the electronics can be connected to the speakers within the walls of the outer shell, with only a relatively short length of wire required inside the interior cavity to connect to the speakers. This may assist with reducing any distortion that may arise from loose wires inside the interior cavity.

With the inner shell correctly suspended within the outer shell mould, a material in the form of an epoxy or polyurethane binding/base material infused with one or more of the following:

Rubber spheres/chips preferably 0.5 mm-3 mm diameter/nominal size;
Glass microspheres of 0.1-0.5 mm diameter, of low specific gravity
Wood fibre
Glass and Granite rumbled or sharp pieces 2-3 mm nominal size
Various powders to thicken or change the liquidity of the mixture as are well known in the art.

However, it will be appreciated that this list is not intended to be limiting.

Rubber spheres/chips may be used to dampen/absorb the sound impacting on the outer shell. Glass microspheres may be used for mass reduction and process improvement as well as improving pour-ability and homogeneity (i.e. reducing separation of heavy solids under gravity while the liquid mixture is in the mould). Wood fibre may be added to provide damping, mass reduction and cost reduction while a glass and granite mixture may be used to provide mechanical strength to the outer shell.

Once the material has cured the outer shell mould 12 is removed to expose the outer shell 3 of the speaker enclosure, as shown in a rear cut away view in FIG. 5. FIG. 6 shows a cut away view of the front of the speaker enclosure. The outer shell is bounded internally by the inner shell 2, which results in a single piece casting for the outer shell 3 which has the inner shell 2 as its interior surface.

The three horizontal ribs, 6, can be clearly seen extending into the interior cavity 7 of the speaker enclosure, as can the rib 9 which extends in a vertical plane along the top, rear and base sides of the interior cavity of the speaker enclosure. Likewise, the formed port 10 and the rear of the housing 11 for the electronics are shown in FIG. 5 and the speaker apertures 4, 5 for mounting the speakers are shown in FIG. 6. Note that the spacing between the central rib (of the three horizontal ribs) and each of the adjacent horizontal ribs is different, which may reduce or prevent summation of similar frequency panel resonances within the interior cavity that may arise if the spacing between adjacent pairs of ribs were to be the same.

Figure 7:
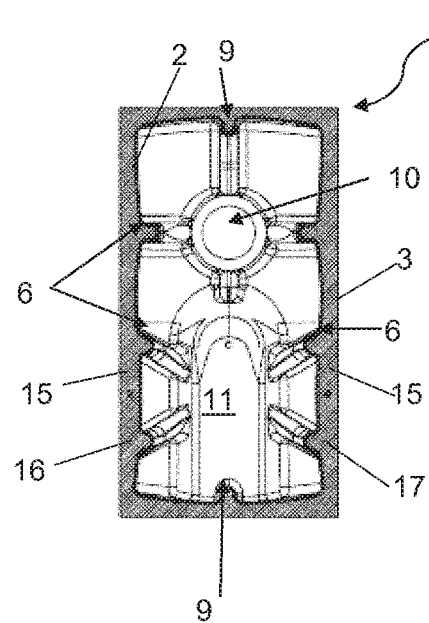
FIG. 7 shows another view of the section shown in FIG. 5.
Figure 8:
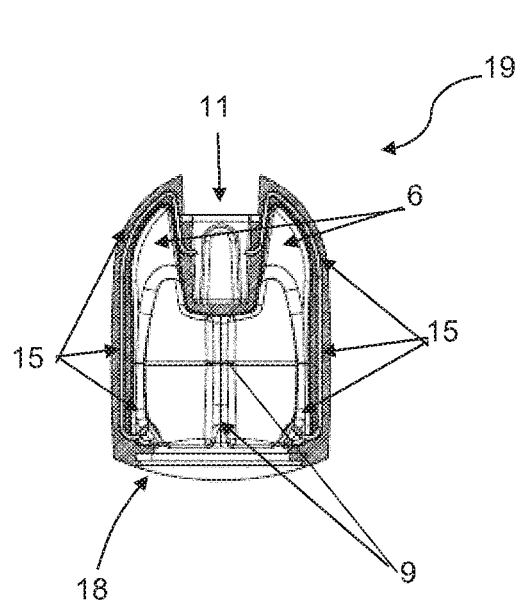
FIG. 8 shows another a horizontal cut away section of the speaker enclosure shown in FIG. 5.

FIG. 7 shows a vertical cross section cut away view of the speaker enclosure in which the walls of the outer shell have been shaded. This illustrates that the walls of the inner shell have been shaped so that they form smoothly curved contours only. Furthermore, the cross section of FIG. 7 shows that opposing wall surfaces of the inner shell (e.g. 16, 17) are not parallel to one another. One consequence of this is that the thickness of the exterior shell is continuously varying around the speaker enclosure. FIG. 7 also shows the electrical connections 15 embedded within the wall of the outer shell.

A cut away horizontal cross section view through the speaker enclosure from the front 1 to the rear (generally indicated by arrows 18 and 19 respectively) of the speaker enclosure. This view shows the electronic connections 15 embedded in the wall of the outer shell, the housing 11 for the electronics, the horizontal rib 6 and the rib 9 in the base of the speaker enclosure.

In the final step of the method of forming the speaker enclosure a sound absorbing material in the foam of a glass fibre/wool blend is stuffed into the interior cavity of the speaker enclosure.

The entire disclosures of all applications, patents and publications cited above and below, if any, are herein incorporated by reference.

Reference to any prior art in this specification is not, and should not be taken as, an acknowledgement or any form of suggestion that that prior art forms part of the common general knowledge in the field of endeavour in any country in the world.

The invention may also be said broadly to consist in the parts, elements and features referred to or indicated in the specification of the application, individually or collectively, in any or all combinations of two or more of said parts, elements or features.

Where in the foregoing description reference has been made to integers or components having known equivalents thereof, those integers are herein incorporated as if individually set forth.

It should be noted that various changes and modifications to the presently preferred embodiments described herein will be apparent to those skilled in the art. Such changes and modifications may be made without departing from the spirit and scope of the invention and without diminishing its attendant advantages. It is therefore intended that such changes and modifications be included within the present invention.

The invention may also be said broadly to consist in the parts, elements and features referred to or indicated in the specification of the application, individually or collectively, in any or all combinations of two or more of said parts, elements or features.

Aspects of the present invention have been described by way of example only and it should be appreciated that modifications and additions may be made thereto without departing from the scope thereof as defined in the appended claims.

What I claim is:

1. A method of forming a dual composite enclosure for an audio speaker via a molding process including:
   forming an inner shell in a single step via additive manufacturing, wherein said inner shell forms an internal cavity for the enclosure, wherein the inner shell is in a single layer and configured to accept the speaker;
   forming an outer shell for the walls of the enclosure, by suspending the inner shell inside an outer shell mold, and filling a cavity between the suspended inner shell and the outer shell mold with a material, wherein the outer shell has an inner surface bounded by the inner shell, and wherein the outer shell is a single piece monocoque construction, which includes all the load bearing structures of the enclosure; and
   removing the outer shell mold.

2. The method of claim 1, wherein forming the outer shell for the speaker enclosure includes forming a rib in the outer shell.

3. The method of claim 2, wherein forming the rib includes forming a rib that extends into an interior cavity of the speaker enclosure, the interior cavity being bounded by an interior surface of the inner shell.

4. The method of claim 2, wherein forming the rib includes forming at least a portion of the rib having a smoothly curved cross section.

5. The method of claim 2, wherein forming the rib includes forming the rib such that an entire length of the rib includes a smoothly curved cross section.

6. The method of claim 5, wherein the rib is formed in the outer shell such that a portion of the surface of the rib resembles a front edge of an airfoil.

7. The method of claim 6, wherein forming the rib includes forming a rib that extends along a side of the interior cavity, the rib being orientated in a plane substantially parallel to a longitudinal axis of the speaker.

8. The method of claim 7 wherein forming the rib includes forming a rib that extends around the interior surface of the inner shell.

9. The method of claim 2, wherein forming the outer shell includes forming a plurality of ribs.

10. The method of claim 9, wherein forming the outer shell includes forming two or more ribs each of which includes a smoothly curved cross section that extends along a side of and into the interior cavity of the speaker cabinet.

11. The method of claim 9, wherein a spacing between each adjacent pair of ribs has a different value for each pair of ribs.

12. The method of claim 1, wherein the inner shell is sufficiently rigid so as not to distort when the cavity between the inner shell and the outer shell mold is filled with a material.

13. The method of claim 12, wherein forming the inner shell includes forming contours in the inner shell which create load bearing structures in the outer shell of the enclosure when formed.

14. The method of claim 12, wherein forming the inner shell includes forming opposing sides of the inner shell which are not parallel to one another.

15. The method of claim 12, wherein forming the inner shell includes configuring the inner shell to accept a plurality of speakers.

16. The method of claim 15, wherein the method of forming the speaker enclosure includes forming the inner shell and the outer shell to form an electronics cavity in the speaker enclosure.

17. The method of claim 16, wherein the electronics cavity is formed outside of the interior cavity of the speaker enclosure.

18. The method of claim 17, wherein the electronics cavity is located on the side of the speaker cavity opposite to the side housing the speaker; or in the bottom of the enclosure.

19. The method of claim 1, wherein the inner shell, or a portion thereof, is formed as a single piece.

20. The method of claim 1, wherein forming the inner shell includes forming a port through the outer shell of the speaker enclosure.

21. The method of claim 20, wherein the port forms part of the load bearing structure.

22. The method of claim 1, wherein the outer shell includes therein electrical reticulation and connections for the speaker and electronics.

23. The method of claim 1, wherein the method includes applying an open celled, medium density, foam structure to the interior surface of the inner shell.

24. An enclosure for an audio speaker formed by the method of claim 1.

25. The method of claim 1, wherein the material is an epoxy or polyurethane binding/base material infused with one or more materials selected from the group consisting of rubber spheres/chips 0.5 mm-3 mm diameter/nominal size, glass microspheres of 0.1-0.5 mm diameter, of specific gravity less than 0.5, wood fiber, glass and granite rumbled or sharp pieces 2-3 mm nominal size and a powder to thicken or change the liquidity of the mixture.

26. A method of forming an enclosure for an audio speaker, the method comprising:
   forming an inner shell which in use will form the internal cavity of the enclosure via additive manufacturing, the inner shell being in a single piece and configured to accept the speaker; and
   forming an outer shell for the walls the enclosure, the outer shell having an inner surface bounded by the inner shell, wherein the outer shell is a single piece monocoque construction which includes all the load bearing structures of the enclosure; and
   forming an inner shell wherein the thickness of the inner shell is in a range of 1 mm to 3 mm.

27. A method of forming an enclosure for an audio speaker, the method comprising:
   forming an inner shell which forms an internal cavity of the enclosure via additive manufacturing, wherein the inner shell is a single piece and is configured to accept the speaker; and
   forming an outer shell for walls of the enclosure, wherein the outer shell has an inner surface bounded by the inner shell,
   wherein the outer shell is a single piece monocoque construction which includes all load bearing structures of the enclosure; and
   forming a randomly rippled surface over at least a portion of an interior surface of the inner shell.

28. A method of forming an enclosure for an audio speaker, comprising:
   forming an inner shell which forms an internal cavity of the enclosure via additive manufacturing, wherein the inner shell is a single piece and configured to accept the speaker; and
   forming an outer shell for the walls of the enclosure, wherein the outer shell has an inner surface bounded by the inner shell,
   wherein the outer shell is a single piece monocoque construction which includes all the load bearing structures of the enclosure; and
   applying foam to the interior surface of the inner shell and forming a layer having a thickness equal to a quarter of the wavelength of a predetermined frequency to be controlled.

* * * * *